United States Patent
Gouda et al.

(10) Patent No.: US 10,983,259 B2
(45) Date of Patent: Apr. 20, 2021

(54) INFRARED LAMP HAVING CUT FILTER CUT-ON WAVELENGTH BETWEEN STARTING STAGE PEAK WAVELENGTH AND STEADY STATE PEAK WAVELENGTH

(71) Applicant: PHOENIX ELECTRIC CO., LTD., Himeji (JP)

(72) Inventors: Tetsuya Gouda, Himeji (JP); Kenichi Yamashita, Himeji (JP)

(73) Assignee: PHOENIX ELECTRIC CO., LTD., Hyogo (JP)

( * ) Notice: Subject to any disclaimer, the term of this patent is extended or adjusted under 35 U.S.C. 154(b) by 146 days.

(21) Appl. No.: 16/404,171

(22) Filed: May 6, 2019

(65) Prior Publication Data

US 2019/0361157 A1 Nov. 28, 2019

(30) Foreign Application Priority Data

May 22, 2018 (JP) ................. JP2018-98287

(51) Int. Cl.
| | |
|---|---|
| G02B 5/20 | (2006.01) |
| F21K 9/00 | (2016.01) |
| F21V 9/40 | (2018.01) |
| F21S 41/20 | (2018.01) |
| F21S 41/13 | (2018.01) |

(52) U.S. Cl.
CPC ............. *G02B 5/208* (2013.01); *F21K 9/00* (2013.01); *F21S 41/13* (2018.01); *F21S 41/285* (2018.01); *F21V 9/40* (2018.02)

(58) Field of Classification Search
CPC . B60Q 1/0088; B60Q 3/16; F21K 9/00; F21S 41/13; F21S 41/20; F21S 41/285; F21V 9/40; F21Y 2115/10; F41G 1/35; F41G 1/36; G02B 5/10; G02B 5/208; G02B 19/0014; G02B 19/0023; G02B 19/0061; G02B 19/009; H01K 1/26

USPC ........................................................ 359/350
See application file for complete search history.

(56) References Cited

U.S. PATENT DOCUMENTS

| 10,317,591 | B2 * | 6/2019 | Ge ......................... G02B 5/223 |
| 2002/0070360 | A1 | 6/2002 | Machi |
| 2002/0118282 | A1 | 8/2002 | Nakamura |
| 2005/0052104 | A1 | 3/2005 | Schmidt |
| 2005/0243172 | A1 | 11/2005 | Takano et al. |

(Continued)

FOREIGN PATENT DOCUMENTS

| DE | 10301829 A1 | 8/2004 |
| DE | 102012005884 A1 | 9/2012 |
| DE | 102012024773 A1 | 6/2014 |

(Continued)

OTHER PUBLICATIONS

EPO, Extended European Search Report for the corresponding European Patent Application No. 19175844.0, dated Oct. 28, 2019 (11 pages).

(Continued)

*Primary Examiner* — Ryan S Dunning
(74) *Attorney, Agent, or Firm* — Lucas & Mercanti, LLP

(57) ABSTRACT

An infrared lamp 100 is composed of an LED 110 that emits infrared light and a cut filter 120 that transmits a part of the light from the LED 110. And a peak wavelength of the light emitted from the LED 110 in the lighting starting stage is set to be shorter than a cut-on wavelength of the cut filter 120.

2 Claims, 4 Drawing Sheets

(56) References Cited

U.S. PATENT DOCUMENTS

2005/0248954 A1 11/2005 Eschler et al.
2007/0052805 A1 3/2007 Inagaki et al.

FOREIGN PATENT DOCUMENTS

| EP | 3222904 A1 | 9/2017 |
|---|---|---|
| FR | 2730035 A1 | 8/1996 |
| JP | S60-30186 A | 2/1985 |
| JP | H06-30241 B2 | 4/1994 |
| JP | 2002-240629 A | 8/2002 |
| JP | 2004-136762 A | 5/2004 |
| JP | 2005085755 A | 3/2005 |
| JP | 2006007883 A | 1/2006 |
| JP | 2008-186793 A | 8/2008 |
| KR | 2004-0020412 A | 3/2004 |

OTHER PUBLICATIONS

Jörg Moisel, "Solid State Night Vision Systems," Proceedings of SPIE, 2005, pp. 47-54, vol. 5663, SPIE, Bellingham, WA.
JPO, Office Action for the corresponding Japanese Patent Application No. 2018-098287, dated Jan. 19, 2021, with English translation.

* cited by examiner

INFRARED LAMP HAVING CUT FILTER CUT-ON WAVELENGTH BETWEEN STARTING STAGE PEAK WAVELENGTH AND STEADY STATE PEAK WAVELENGTH

CROSS REFERENCE TO RELATED APPLICATION

This application claims the priority of Japanese Patent Application No. 2018-098287 filed on May 22, 2018, which are incorporated by reference herein.

BACKGROUND OF THE INVENTION

Field of the Invention

The present invention relates to an infrared lamp for illuminating an object to be imaged by an infrared camera. The Background of the Invention

Background Art

In the past, an infrared lamp that emits infrared light has been proposed, for example, in Laid-open Patent Application Publication No. JP2005-85755.

In addition, in recent years, infrared cameras capable of capturing an image of an object illuminated with infrared light have been developed. And by utilizing the fact that infrared light is hard to be perceived with human eyes, for example, infrared cameras are installed on railways or roads to be used for traffic monitoring of trains or automobiles at night.

SUMMARY OF THE INVENTION

By the way, the wavelength of the light emitted from the infrared lamp has a predetermined range, and the light from the infrared lamp designed to mainly emit near-infrared light close to visible light may include visible light (red light).

Since an infrared lamp emitting light including visible light (red light) looks red by a person, when installed on a rail road or a road as described above. There is a possibility that a train staff member or a driver of an automobile may mistake the infrared lamp for a red signal.

In order to avoid such a problem that the visible light (red light) can be seen, it is also able to use, for example, an infrared lamp that emits infrared light of a longer wavelength. The visible light (red light) will be not included even if the wavelength of the emitted light has wide range.

However, when an LED (Light Emitting Diode) is used as a light source, generally, there is a problem that the longer the wavelength of emitted infrared light, the worse the luminous efficiency. Also, the infrared camera has a problem that the longer the wavelength of the infrared light illuminating the object, the more difficult it becomes to image the object.

In addition, since the intensity of the light emitted from the LED generally decreases as the temperature of the LED rises, there has been a problem that the change between the intensity of the light in the lighting starting stage and the intensity of the light in the steady-state lighting stage is large and unstable.

The present invention has been made in view of the above-mentioned problems, and an object thereof is to provide an infrared lamp capable of emitting near-infrared light close to visible light (red light) with high efficiency, preventing visible light (red light) from being included in the emitted light, and further capable of emitting light of stable intensity with a small change in intensity of the emitted light between the lighting starting stage and the steady-state lighting stage.

According to an aspect of the present invention, an infrared lamp that includes an LED and a cut filter is provided. The LED emits infrared light. The cut filter transmits a portion of light from the LED. And a peak wavelength of light emitted from the LED in a lighting starting stage is on a side shorter than a cut-on wavelength of the cut filter.

It is preferable that the peak wavelength of the light emitted from the LED in a steady-state lighting stage is on the side longer than the cut-on wavelength of the cut filter.

It is preferable that the peak wavelength of the light emitted from the LED at the lighting starting stage is 900 nm or more and 950 nm or less. And the cut-on wavelength of the cut filter is longer than the peak wavelength by 0 nm or more and 30 nm or less.

According to the present invention, it is possible to provide an infrared lamp capable of emitting near-infrared rays close to visible light (red light) with high efficiency and preventing visible light (red light) from being included in the emitted light. Further, according to this infrared lamp, it is possible to emit light of which the change in the intensity of the light emitted between the lighting starting stage and the steady-state lighting stage is small and the intensity is steady.

DETAILED DESCRIPTION OF EMBODIMENTS (Configuration of Infrared Lamp 100)

Figure 1:
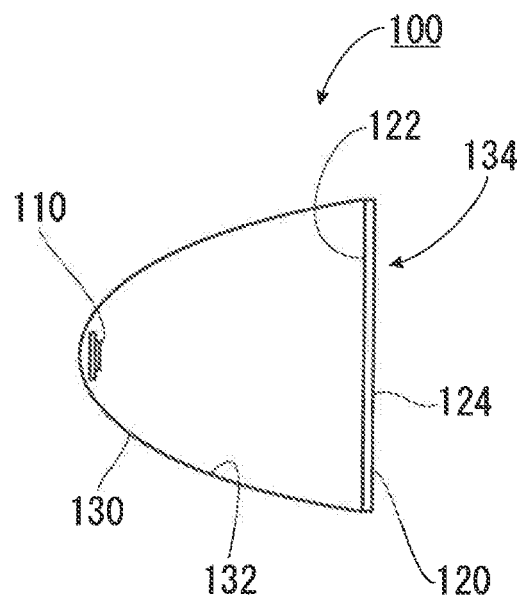
FIG. 1 shows an infrared lamp 100 according to an embodiment.

An infrared lamp 100 to which the present invention is applied will be described with reference to the drawings. FIG. 1 is a diagram showing an infrared lamp 100 according to the present embodiment.

The infrared lamp 100 according to the present embodiment generally includes an LED 110, a cut filter 120, and a reflector 130. The reflector 130 is not essential to this invention. In other words, the infrared lamp 100 may be composed with the LED 110 and the cut filter 120.

The LED 110 is a device that emit light having a predetermined emission spectrum including infrared light by receiving power from a power supply device (not shown). In this emission spectrum, the wavelength of light at which the spectral irradiance is maximized is referred to as the "peak wavelength" of light emitted from the LED 110. The type of the LED 110 can be a surface mount type (SMD) or a chip-on-board type (COB). In general, the surface mount type is advantageous in that power supply terminals are provided on the back surface of the chip, and the chip can be reduced in size because the power supply terminals can be turned on only by soldering to the power supply terminal. In addition, the chip-on-board type is advantageous in that the heat dissipation performance can be easily enhanced by attaching the chip directly to an aluminum sheet or the like having a high heat dissipation property because the power supply terminals are provided on the surface of the chip.

Figure 2:
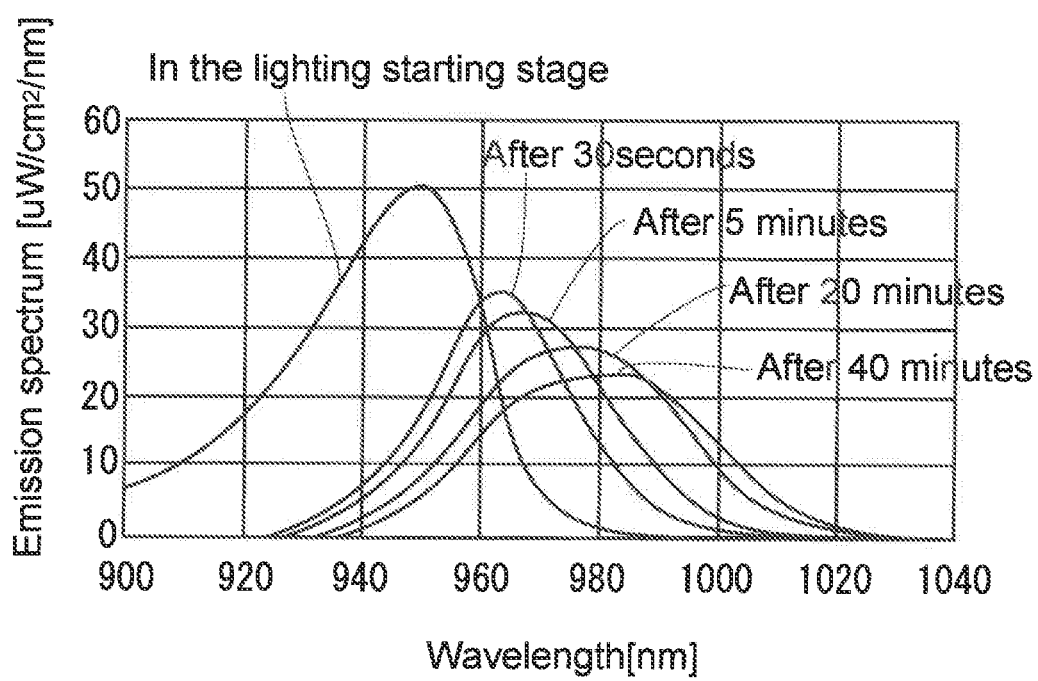
FIG. 2 is a graphical representation of the emission spectrum of light from an LED 110 showing the shifting of peak wavelengths over time from the lighting starting stage. It should be noted that the cut filter 120 is not provided in all of the cases.

Generally, the light emitted from the LED 110 tends to shift from the lighting starting stage of the LED 110 to a longer "peak-wavelength" due to an increase in the temperature of the LED 110 itself as it enters the steady-state lighting stage. This phenomenon is referred to as the "peak wavelength shifts". For example, in the case of a LED 110 having an emission spectrum as shown in FIG. 2, the "peak wavelength" in the lighting starting stage is 948 nm, but after that, the "peak wavelength" is shifted to a longer wavelength side such as 966 nm after 30 seconds from the lighting start, 970 nm after 5 minutes, 977 nm after 20 minutes and 982 nm after 40 minutes.

It is preferable that the peak wavelength of the light emitted from the LED 110 at the lighting starting stage is 900 nm or more and 950 nm or less. This is because, if the peak wavelength of light emitted from the LED 110 at the lighting starting stage is less than 900 nm, depending on the cut-on wavelength of the cut filter 120 to be described later, the visible light (red light) may be visible from the infrared lamp 100 when viewed by a person. Conversely, if the peak wavelength is longer than 950 nm, the emission efficiency of the LED 110 may be worse, as described above. And at present, there is no infrared camera having the peak wavelength sensitivity on the wavelength longer side than 950 nm.

Returning to FIG. 1, the cut filter 120 is a plate-like or film-like member having a dielectric multilayered film or the like formed on the surface thereof. The light input surface 122 receives light from the LED 110. And the cut filter 120 transmits and emits the light from the light output surface 124 having a wavelength longer than a predetermined wavelength. The cut filter 120 blocks light having a wavelength shorter than the predetermined wavelength.

Figure 3:
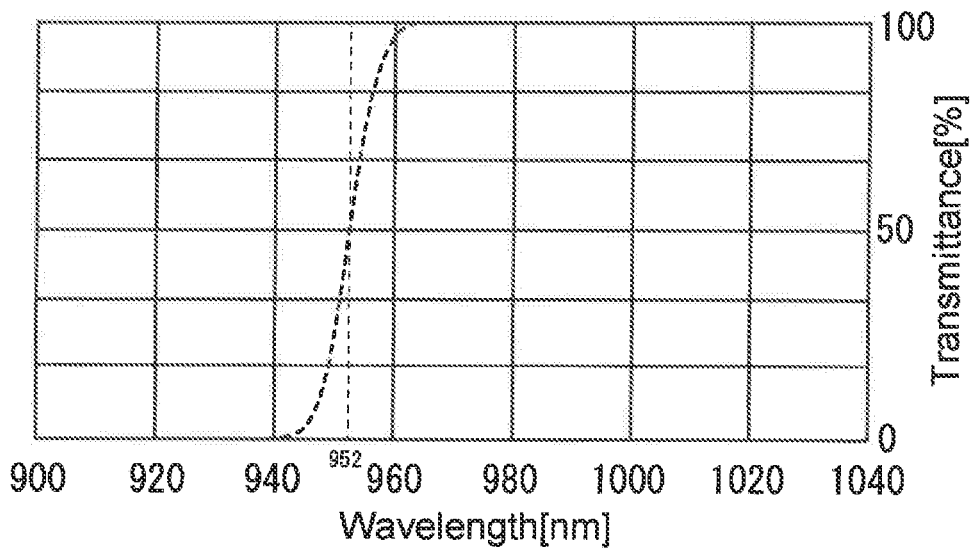
FIG. 3 is a graph showing the light blocking performance by the cut filter 120.

The light blocking performance of the cut filter 120 will be described with reference to FIG. 3. In general, the light blocking performance by the cut filter 120 has a range, and in the example shown in FIG. 3, 100% of the light entering from the light input surface 122 is emitted from the light output surface 124 for light having a wavelength longer than 965 nm. That is, light having a wavelength longer than 965 nm is not blocked by the cut filter 120.

Conversely, for light having a wavelength shorter than 940 nm, all of the light entering from the light input surface 122 is blocked. In other words, the cut filter 120 has a transmittance of 0% for light having a wavelength shorter than 940 nm.

With respect to the light having a wavelength of 940 nm or more and 965 nm or less, a predetermined proportion of the light entering from the light input surface 122 is emitted from the light output surface 124. For example, in the case of 956 nm light, 75% of the light entering from the light input surface 122 is emitted from the light output surface 124. In the case of 952 nm light, 50% of the light entering from the light input surface 122 is emitted from the light output surface 124. Throughout this specification, the wavelength of light having such a transmittance of 50% is referred to as the "cut-on wavelength" of the cut filter 120.

The "cut-on wavelength" of the cut filter 120 according to the present embodiment is set to be longer than the peak wavelength of the light emitted from the LED 110 in the lighting starting stage described above. Moreover, the "cut-on wavelength" is set to be shorter than the peak wavelength of the light emitted from the LED 110 in the steady-state lighting stage.

The cut-on wavelength of the cut filter 120 is preferably set to be longer than the peak wavelength of the LED 110 by 0 nm or more and 30 nm or less. This is because when the cut-on wavelength of the cut filter 120 is shorter than the peak wavelength of the LED 110, much of the light from the LED 110 passes through the cut filter 120 in the lighting starting stage, and almost all of the light passes through the cut filter 120 in the steady-state lighting stage, so that the significance of using the cut filter 120 is lost. In addition, the difference between the intensity of the light from the LED 110 in the lighting starting stage and the intensity of the light from the LED 110 in the steady-state lighting stage cannot be narrowed.

On the other hand, if the cut-on wavelength of the cut filter 120 is longer than 30 nm relative to the peak wavelength of the LED 110, even when the LED 110 is in a steady-state lighting stage, most of the light cannot transmit through the cut filter 120. It is inefficient when the entire infrared lamp 100 is considered.

Returning to FIG. 1, the reflector 130 is a bowl-shaped member, and a LED 110 is disposed at the inner bottom portion thereof. A reflective surface 132 for reflecting light from the LED 110 is formed on the inner surface of the reflector 130. The reflective surface 132 in the present embodiment is defined by a paraboloid of revolution. But the shape of the reflective surface 132 is not limited to this, and may be a spheroid or other shape.

Further, the reflector 130 has an opening 134 for emitting light from the LED 110 to the outside. In the present embodiment, the cut filter 120 is disposed so as to cover the opening 134.

Note that glass, aluminum, resin, or the like is used as a material of the reflector 130. And in the case of aluminum, for example, metal evaporation is performed on the reflective surface 132 (or alumite treatment may be performed instead of metal evaporation). In the case of glass, in addition to a metal film of aluminum or the like, a visible light reflection film formed by multilayer coating can also be used.

(Operation of the Infrared Lamp 100)

Next, an operation when the infrared lamp 100 according to the present embodiment described above emits light will be described. When power is supplied to the LED 110 from a power supply device (not shown), the LED 110 emits light having a predetermined emission spectrum including infrared light. Part of this light directly enters the light input surface 122 of the cut filter 120 disposed in the opening 134 of the reflector 130, and the remainder enters the light input surface 122 of the cut filter 120 after being reflected by the reflective surface 132 of the reflector 130.

Figure 4:
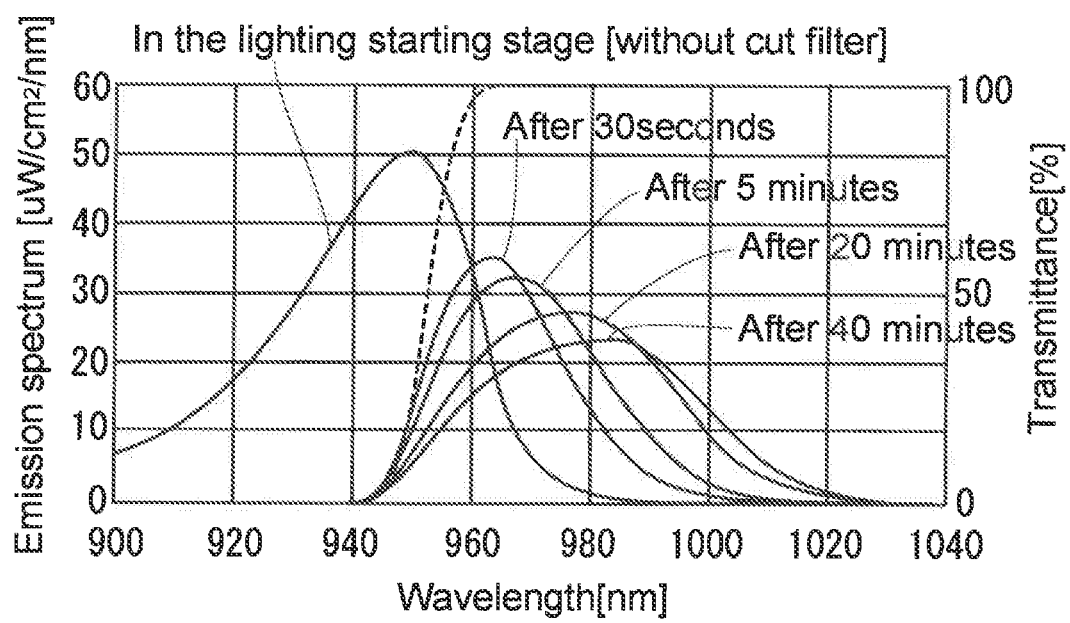
FIG. 4 is a graph showing an emission spectrum of light emitted from the infrared lamp 100 according to the embodiment. In this graph, the emission spectrum of the "lighting starting stage" shows a case without the cut filter 120. And the "after 30 seconds", "after 5 minutes", "after 20 minutes", and "after 40 minutes" show the cases with the cut filter 120.

As shown in FIG. 4, the peak wavelength of the light emitted from the LED 110 in the lighting starting stage is shorter than the cut-on wavelength of the cut filter 120. Therefore, most of the light in the lighting starting stage cannot pass through the cut filter 120, and the amount of light (infrared light) emitted from the light output surface 124 of the cut filter 120 to the outside is small.

Thereafter, as time elapses and the stage proceeds to the steady-state lighting stage from the lighting starting stage, the peak wavelength of the light emitted from the LED 110 shifts toward the longer side. And the peak wavelength becomes longer than the cut-on wavelength of the cut filter 120 from a certain time. As described above, when entering the steady-state lighting stage, most of the light from the LED 110 passes through the cut filter 120, and the quantity of the light (infrared light) emitted outside from the light output surface 124 of the cut filter 120 becomes sufficiently large.

Figure 5:
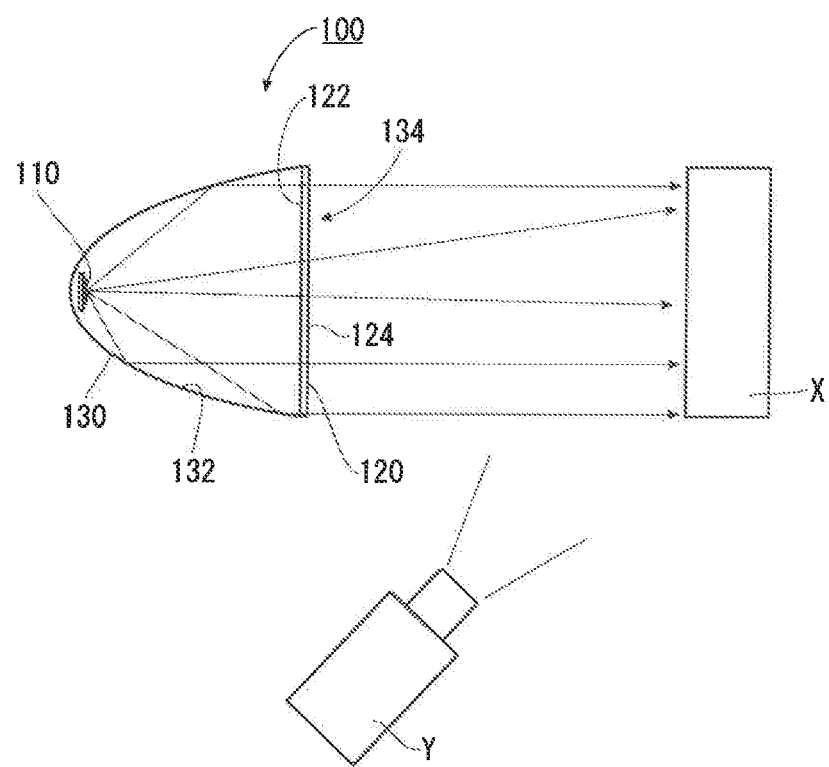
FIG. 5 is a diagram showing a state of use of the infrared lamp 100 according to the embodiment.

In this manner, the light (infrared light) emitted outside from the light output surface 124 of the cut filter 120 illuminates the predetermined object X (see FIG. 5). Then, by imaging the object X illuminated by the infrared light with the infrared camera Y, the object X can be imaged in the dark in which there is almost no visible light.

(Features of the Infrared Lamp 100)

According to the infrared lamp 100 of the embodiment described above, since the peak wavelength of the light emitted from the LED 110 in the lighting starting stage is on the side shorter than the cut-on wavelength of the cut filter 120, it is possible to use an LED 110 having the peak wavelength which is on the relatively short wavelength side even in the steady-state lighting stage after the "shift of the peak wavelength." As a result, it is possible to prevent the infrared lamp 100 during lighting from being looked red. And it is possible to use the LED 110 with highly efficient in light emission having a peak wavelength on a relatively short wavelength side (near-infrared side close to visible light). Also, a general infrared camera which can exhibit maximum performance with infrared light closer to the visible light range can be used as the infrared camera Y.

Since the peak wavelength of the light emitted from the LED 110 in the steady-state lighting stage is longer than the cut-on wavelength of the cut filter 120, the object X can be irradiated with more infrared light through the cut filter 120 after entering the steady-state lighting stage. Although the intensity of the light emitted from the LED 110 decreases as the temperature of the LED 110 increases compared to the lighting starting stage, the ratio of the light emitted from the LED 110 passing through the cut filter 120 increases. Therefore, the change in the intensity of the light emitted from the infrared lamp 100 between the lighting starting stage and the steady-state lighting stage is small, and light of a stable intensity can be emitted.

Variation

Figure 6:
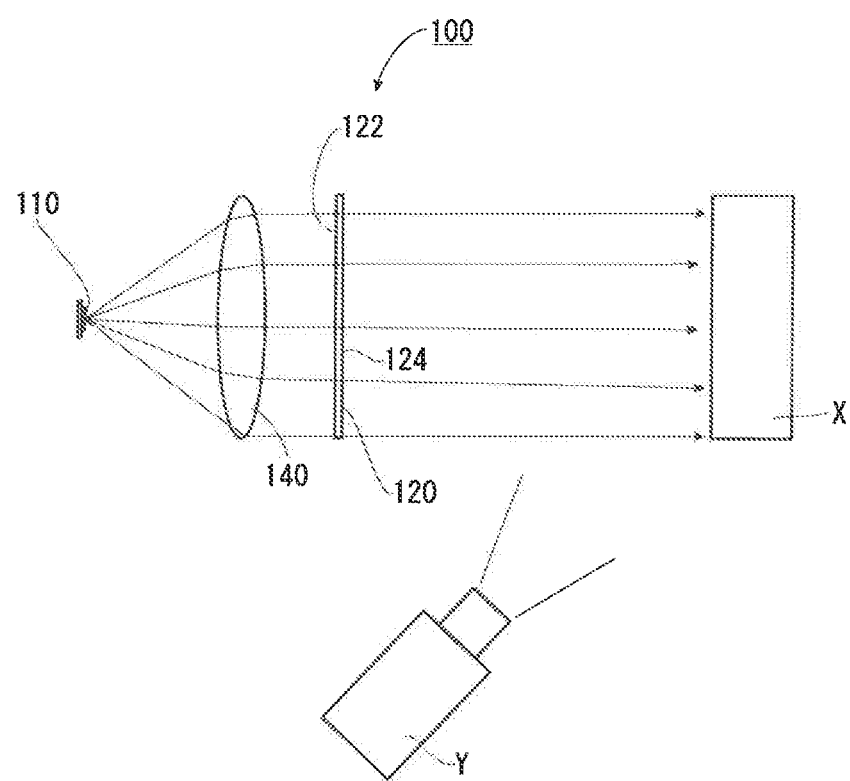
FIG. 6 is a diagram showing a state of use of the infrared lamp 100 according to another embodiment.

In the embodiment described above, the reflector 130 that reflects the light emitted from the LED 110 is used, but a lens 140 may be used instead of the reflector 130, for example, as shown in FIG. 6. In this instance, the light from the LED 110 condensed with the lens 140 to some extent enters into the cut filter 120 through the light input surface 122.

Although the invention has been described in its preferred form with a certain degree of particularity, it is understood that the present disclosure of the preferred form has been changed in the detail of construction and the combination and arrangement of parts may be resorted to without departing from the spirit and scope of the invention as hereinafter claimed.

The disclosure of Japanese Patent Application No. 2018-098287 filed on May 22, 2018 including specifications, drawings and claims are incorporated herein by reference in its entirely.

What is claimed is:

1. An infrared lamp comprising:
   an LED that emits infrared light; and
   a cut filter transmitting a portion of light from the LED,
   wherein a cut-on wavelength of the cut filter is longer than a peak wavelength of light emitted from the LED in a lighting starting stage, and
   wherein the cut-on wavelength of the cut filter is on a side shorter than a peak wavelength of light emitted from the LED in a steady-state lighting stage.

2. The infrared lamp according to claim 1, wherein the peak wavelength of the light emitted from the LED at the lighting starting stage is 900 nm or more and 950 nm or less, and the cut-on wavelength of the cut filter is longer than the peak wavelength by 0 nm or more and 30 nm or less.

* * * * *